Aug. 12, 1952 W. C. TOSTEVIN 2,606,999
GYROSCOPICALLY CONTROLLED DIRIGIBLE LAMP
Filed Feb. 1, 1950
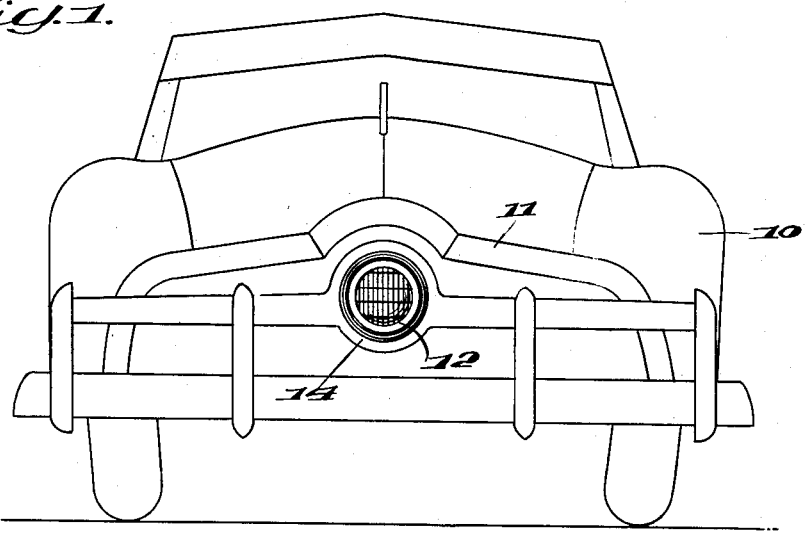
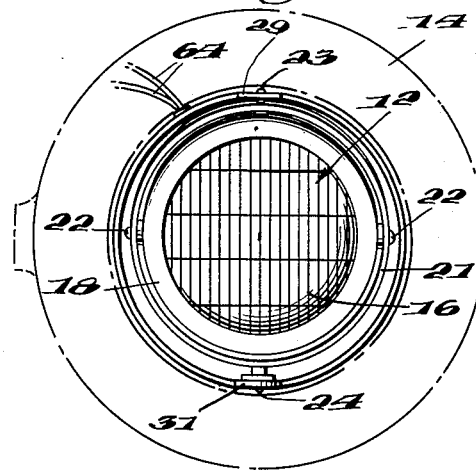
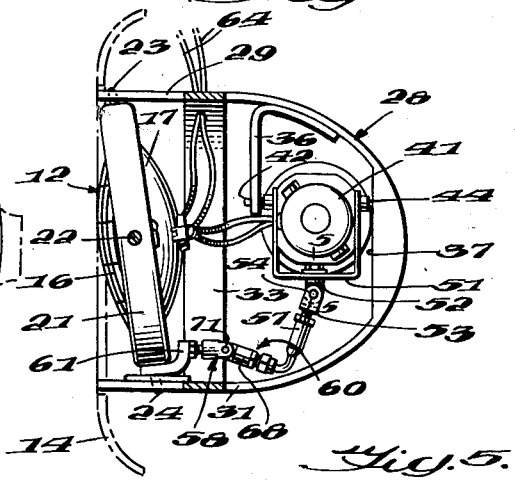
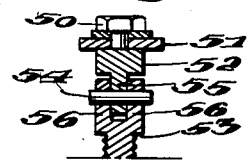
INVENTOR.
WALTER C. TOSTEVIN,
BY
ATTORNEY Patented Aug. 12, 1952

2,606,999

UNITED STATES PATENT OFFICE 2,606,999

GYROSCOPICALLY CONTROLLED DIRIGIBLE LAMP

Walter C. Tostevin, Mandan, N. Dak.

Application February 1, 1950, Serial No. 141,729

3 Claims. (Cl. 240—62)

The present invention relates to a head lamp of the type which is adapted to be shifted in the direction in which a vehicle is steered and the invention more specifically pertains to apparatus in association with a headlight so designed as to swing the head lamp when the vehicle rounds a curve or the like in its path of forward movement. The present invention represents improvements over my Patent 2,321,337, granted June 8, 1943.

An object of the present invention is to provide means in association with a head lamp for an automobile or the like which utilizes the action of gravity and the principles of a gyroscope to alter the position of the head lamp when there is a pronounced departure from a path of straight forward movement without providing a mechanical connection between the lamp and the steering mechanism of the vehicle and to provide a compact dirigible lamp mechanism to facilitate mounting of the assembly on a modern type of motor vehicle.

A further and more specific object of the invention resides in providing improvements in the means for transmitting movement of the flywheel out of its normal plane of rotation to the lamp to so direct the lamp as to illuminate the roadway in front of the vehicle as it turns a corner or rounds a curve.

Other objects and features of the invention will be more apparent to those skilled in the art as the present disclosure proceeds and upon consideration of the accompanying drawing and the following detailed description wherein a typical embodiment of the invention is disclosed.

In the drawing:

Fig. 1 is a diagrammatic front elevational view of an automobile showing a head lamp exhibiting the invention mounted thereon.

Fig. 2 is an enlarged front elevational view of the lamp and the mounting frame.

Fig. 3 is a side elevational view partly in section.

Fig. 4 is a plan view with the frame shown in horizontal section.

Fig. 5 is a sectional view of a detail taken on the line 5—5 of Fig. 3.

Referring to the drawing there is shown at 10 an automobile of the present day type provided with a grill structure 11 at the front of the car. This invention pertains to an auxiliary lamp such as represented at 12 which may be mounted within the grill structure as shown in Fig. 1. In the embodiment illustrated the front grill structure 11 is provided with an enlarged central portion 14 having an opening therein for receiving the lamp 12 and the means for turning the lamp automatically when the automobile makes a turn or rounds a curve in the roadway.

The lamp itself may take any suitable form and in the embodiment illustrated in the drawing the lamp 12 is of the sealed type including a front lens 16 and a rear portion 17 having an internal reflecting surface (not shown) for directing the light waves forwardly through the lens 16 and for illuminating the roadway in front of the car. The peripheral portion of the lamp is encased within an annular rim assembly 18 of any suitable type so as to securely grip the periphery of the glass lamp structure. A metal ring 21 is provided around the perimeter of the annular rim assembly 18 and this ring may be secured to the member 18 by means of screws 22. The ring 21 carries a short stub shaft or pin 23 at the top and a similar pin or stub shaft 24 extends from a lower portion of the ring 21. These stub shafts or pins are provided for the purpose of supporting the lamp assembly for turning movement about a substantially vertical axis.

A frame is provided for supporting the lamp and this frame includes a U-shaped member 28 having an upper arm 29 which extends forwardly to a position above the lamp structure. The lower arm 31 of the U-shaped frame member also projects forwardly in a horizontal direction into the opening provided in the enlarged portion 14 of the grill at the front of the vehicle. An annular band 33 having a diameter slightly greater than the ring 21 is mounted rearwardly thereof and is secured in any suitable manner such as by welding or integral with the arms 29 and 31 of the frame member 28. This frame structure is adapted to be mounted in back of the grill as shown in Fig. 3 in any suitable manner so that the lens 16 of the lamp is mounted within the opening provided in the enlarged portion 14 of the grill structure to thereby provide an artistic appearing auxiliary lamp assembly when mounted on the car.

A bracket 36 is secured to the frame member 28 in any suitable manner and includes a vertically depending portion which extends downwardly from the upper arm 29 in a substantially vertical plane as shown in Fig. 3. The closed end of the frame member 28 is provided with a vertical flat surface 37. This portion of the frame is provided with a bearing and a bearing is also provided in the lower portion of the bracket 36. An electric motor 41 is provided with a horizontal stub shaft 42 which is adapted to be rotatably journalled in the bearing at the lower end of the bracket 36. A similar shaft 44 extends rearwardly from the motor housing and is rotatably supported in the bearing provided in the vertical surface 37. It will be observed that the center of gravity of the motor 41 is below the axis of the aligned stub shafts 42 and 44. Thus the motor tends to remain with its shaft 46 in a horizontal plane extending transversely of the central longitudinal plane of the vehicle. The axis of the stub shafts 42 and 44 are so mounted as to be parallel with the normal straight forward movement of the car and these shafts 42 and 44 are aligned with the central longitudinal center of the automobile.

A U-shaped bracket 51 is rigidly secured to the motor casing and the closed end of this bracket extends below the motor housing as shown in Fig. 3. The invention includes a link connection between the bracket 51 and the head lamp structure. One element 52 of a hinge member is rigidly secured to the bracket 51 by a cap screw 50 and depends therebelow. This element terminates in a tongue 55 which extends between spaced ears 56 of another element 53 of the hinge member. A pin 54 extends through these ears and the tongue 55 to provide a hinge connection immediately below the bracket 51. A ball and socket connection is provided at 60 with the male portion rigidly connected to an arm 57 carried by the element 53 and threaded thereon. A similar hinge connection is provided at 58 and this hinge structure may be rigidly connected to the ring 21 by means of a bracket 61. The hinge connection 58 includes a pivot pin 71 and a hinge element 68 carrying the female socket (not shown) for receiving the ball of the ball and socket joint 60.

The lamp filament and motor 41 are energized by current supplied to the wires 64 so that when the lamp is energized the motor is operated to drive the shaft 46. A flywheel 66 is mounted on the shaft 46 to rotate therewith and it is to be noted that during normal straight forward movement of the car the flywheel 66 rotates in a vertical plane parallel with the forward movement of the vehicle. The flywheel 66 and the motor are so mounted that the center of gravity thereof is below the axis of the stub shafts 42 and 44. The rotating flywheel 66 thus by reason of its weight and the center gravity of the motor structure tends to remain in the plane shown in Fig. 4.

When the vehicle turns laterally during its forward movement the stub shafts 42 and 44 being fixed in relation to the longitudinal axis of the car swing with the vehicle and thus assume a position at an angle to the normal straight forward course of movement. The rotating flywheel 66 is thereby twisted from its normal rotating plane parallel with the straight forward movement of the car since the shafts 42 and 44 are mounted in the frame 28 and the flywheel is thereby twisted from its original plane of rotation. The flywheel 66 is endeavoring to remain in its original plane of rotation which is normally parallel with the straight forward movement of the vehicle and seeking to remain in such a plane of rotating swings laterally and moves the motor casing about the axis of the shafts 42 and 44. The bracket 51 moves with the motor casing. The hinge element 52 is thereby moved laterally and the linkage connection is also shifted to one side. The ball and socket connection 60 permits this movement. The pin 54 is arranged with its axis parallel to the swinging movement of the motor, and lateral movement is imparted to the member 68 of the linkage. The hinge connection member 58 twists the bracket 61 which is rigidly secured to the ring 21 of the lamp structure. The lamp 12 is thereby turned about the axis of the stub shafts 23 and 24 to direct the lamp in the directions in which the vehicle is turning.

After the turn has been completed and normal straight forward movement of the car is resumed the pendulum action of the motor 41 resulting from the center of gravity being positioned below the stub shafts 42 and 44 restores the motor to a position with the shaft 46 in a substantially horizontal position. The flywheel 66 then again rotates in a vertical plane substantially parallel with the longitudinal axis of the vehicle. Thus it will be appreciated that the mechanism herein disclosed provides for swinging of the head lamp upon turning of the vehicle without depending upon the development of centrifugal force and without a mechanical connection between the steering mechanism of the car and the lamp structure.

While the invention has been described with reference to specific structural features and with regard to a particular type of linkage connection between the motor and the lamp it will be understood that changes may be made in these and other features without departing from the spirit and scope of the invention as set forth in the appended claims.

What I claim and desire to secure by Letters Patent is:

1. Apparatus for supporting and turning a head lamp comprising, a substantially U-shaped frame member having an upper horizontal arm and a lower horizontal arm, a lamp, a pin carried by the periphery of the lamp journaled in said upper arm, a pin carried by the periphery of the lamp journalled in said lower arm, an electric motor, a bracket carried by the upper arm depending therebelow, a stub shaft carried by the motor journalled in said bracket, another stub shaft aligned with the first stub shaft carried by the motor journalled on said frame member, said stub shafts being positioned above the center of gravity of the motor, a motor shaft, a flywheel secured to the motor shaft, a U-shaped bracket secured to the motor, and an articulated linkage connection between said U-shaped bracket and said lamp.

2. Apparatus for supporting and turning a head lamp comprising, a substantially U-shaped frame member having an upper horizontal arm and a lower horizontal arm, a lamp, means supporting said lamp on said arms for turning movement about a substantially vertical axis, a bracket carried by the upper arm depending therebelow, an electric motor including a casing therefor, aligned stub shafts carried by the motor casing journalled in said bracket and on said frame member, said stub shafs being positioned above the center of gravity of the motor, a motor shaft, a flywheel secured to the motor shaft, a U-shaped bracket secured to the motor casing, a hinge element rigidly secured to the U-shaped bracket and depending therebelow terminating in a tongue, a second hinge element having ears spanning the tongue, a pin connecting the tongue to said ears arranged at right angles to the axis of said stub shafts, a hinge assembly connected to the lamp, and a ball and socket connection between said hinge assembly and the second hinge element.

3. Apparatus for supporting and turning a head lamp comprising, a substantially U-shaped frame member having an upper horizontal arm and a lower horizontal arm, a lamp, means supporting said lamp on said arms for turning movement about a substantially vertical axis, a bracket depending from said upper arm, an electric motor including a casing, aligned stub shafts carried by said motor casing above the center of gravity of the motor journalled in said bracket and in the closed end portion of said frame member, a shaft for the motor extending transversely of said stub shafts, a flywheel fixed to the motor shaft for normal rotation in a substantially vertical plane parallel to the axis of said stub shafts, a U-shaped bracket secured to the motor casing and depending therebelow, and means including an articulated linkage connection extending between the U-shaped bracket and a lower portion of said lamp whereby the lamp is turned about said vertical axis upon swinging movement of the motor casing about an axis of said stub shafts.

WALTER C. TOSTEVIN.

REFERENCES CITED

The following references are of record in the file of this patent:

UNITED STATES PATENTS

| Number | Name | Date |
| --- | --- | --- |
| 1,360,841 | Whiting | Nov. 30, 1920 |
| 2,109,748 | Klein | Mar. 1, 1938 |
| 2,321,337 | Tostevin | June 8, 1943 |

FOREIGN PATENTS

| Number | Country | Date |
| --- | --- | --- |
| 482,816 | England | Apr. 6, 1938 |
| 512,974 | France | Oct. 27, 1920 |